United States Patent [19]
Lorenc et al.

[11] Patent Number: 4,505,472
[45] Date of Patent: Mar. 19, 1985

[54] ASTRO CAPSULE

[75] Inventors: Allan L. Lorenc, Oelwein; Thomas L. Maring, Cedar Rapids, both of Iowa

[73] Assignee: Rawson Control Systems Inc., Oelwein, Iowa

[21] Appl. No.: 454,038

[22] Filed: Dec. 28, 1982

[51] Int. Cl.³ .............................................. G09B 9/08
[52] U.S. Cl. ...................................... 272/1 C; 434/34
[58] Field of Search ..................... 272/43, 1 C, 16, 17, 272/18, 31 A, 31 B; 434/30, 33, 34, 35, 45, 46, 55, 57, 58

[56] References Cited

U.S. PATENT DOCUMENTS

| 2,063,231 | 12/1936 | Custer | 272/1 C X |
| 2,358,016 | 9/1944 | Link et al. | 434/55 |
| 2,524,238 | 10/1950 | Soulé | 272/1C |
| 2,661,954 | 12/1953 | Koci | 272/1 C |
| 2,869,871 | 1/1959 | Mitchell | 272/43 X |
| 3,517,446 | 6/1970 | Corylon et al. | 434/45 |
| 3,597,857 | 8/1971 | Aylesbury et al. | 434/58 |
| 3,818,613 | 6/1974 | Julian et al. | 434/33 |
| 3,829,988 | 8/1974 | Burny | 434/58 |
| 4,019,261 | 4/1977 | Pancoe | 434/58 |

OTHER PUBLICATIONS

"Autorovo" Kiddie Rides Flyer, Received Group 330, Oct. 27, 1983.
Circus of Fun!, Kiddie Rides USA ™ Flyer, Lower Left Corner, Received Group 330, Oct. 27, 1983.

Primary Examiner—Robert A. Hafer
Assistant Examiner—Arnold W. Kramer
Attorney, Agent, or Firm—Hugh D. Jaeger

[57] ABSTRACT

Astro capsule intended for use as a toy and raisable and rotatable on a four-bar linkage by hydraulic cylinders through hydraulic circuits. An electrical circuit provides for sequenced flashing flight lights, pulsating front gun lights, and for providing through a speaker a rocket sound and a phasor gun sound. The hydraulic circuits include a novel single spool for regulating flow through a valve between a combined motor pump tank to a cylinder at a fast speed up and slow speed down, and a hydraulically actuated system for rotating the capsule about its vertical axis. The vertical motion valve is mechanically linked to the joystick for ascending and descending motion and electrically controlled by the joystick for hydraulic actuation of the capsule about its vertical axis. The four-bar linkage includes a safety bar which overrides the joystick in the event that an individual or an object is positioned under the linkage in an elevated condition. Additionally, a safety switch positioned on the safety bar acts independently of the safety bar to trap fluid in the hydraulic cylinder to prevent its descent should an individual or object be positioned under the linkage in an elevated condition during or after the timed ride. The hydraulic circuit is provided with a joystick stop limit within the joystick throttle structure, a valve control stop link, a safety bar limit, a safety switch and solenoid shutoff valve, and the inherent four-bar linkage limit.

15 Claims, 10 Drawing Figures

ASTRO CAPSULE

BACKGROUND OF THE INVENTION

1. Field of the Invention

The present invention pertains to a toy and flight simulator and, more particularly, pertains to a hydraulically and electromechanically operated aircraft, in this particular instance an astro capsule.

2. Description of the Prior Art

The prior art helicopters and airplanes usually labeled as "toys" or "amusement devices" have lacked in reliability and safety. The prior art devices have had an unusual number of electromechanical as well as hydraulic parts requiring large hydraulic reservoirs and circuits along with numerous hydraulic components, leading to a reliability problem and frequent breakdown. The prior art devices have usually utilized a plurality of control valves in hydraulic circuits requiring large amounts of hydraulic fluid and valving. This has led to reliability problems as well as excessive uses of energy in powering the amusement devices. Another particularly important problem in recent years has been safety of the devices and overrides not only for the individual in or on the ride but for those in close proximity, and has always been a problem with individuals possibly crawling under the toys as they are in an elevated position and then with the device coming down and tending to compress or crush the individual or his bodily components thereof.

The present invention overcomes the disadvantages of the prior art by providing a new and novel spool valve in a hydraulic circuit, a low-voltage safety switch and safety shutoff valve, and a safety bar as well as stop limits inherently fabricated into a four-bar linkage, providing for least amount of use of hydraulic energy as well as maximum safety, not only to the individual in the amusement device but also to those in the surrounding area.

SUMMARY OF THE INVENTION

The general purpose of the present invention is to provide an amusement device for trainer simulator of an aircraft operated by hydraulic cylinders between a rest position and an elevated position as well as directional control to simulate flight, with audible flight engine sounds and firing control sounds, and including safety structure for the individual operating the aircraft as well as those in the immediate surrounding vicinity. The aircraft is hydraulically raised through a four-bar linkage, directionally controlled through a hydraulically actuated drum, and includes electromechanical circuitry for sequenced flashing flight lights and gun lights, along with providing audio sounds of flight as well as firing of weapon systems.

According to embodiments of the present invention, there is provided an aircraft simulator and amusement device including a metal rectangular frame supporting a hydraulic circuit including motor, pump, and tank, three-way selector valve having a configured spool and connected to a hydraulic cylinder providing for vertical movement, and to provide rotary movement, a joystick control which when actuated laterally controls a solenoid operated four-way three-position selector valve connected to two hydraulic cylinders, the same said cylinders secured by cable to a rotatable drum upon which is fastened an astro capsule, a four-bar linkage connected between the frame and joystick pad, a hydraulic cylinder connected between the frame and a mid-portion of the four-bar linkage, a linkage connected between the joystick and the spool of the valve, a safety bar connected between the joystick pad, the joystick linkage, and the frame, the joystick pad including fixed limits within which to reciprocate, the safety bar including slotted fixed limits for movement of the joystick linkage, and the valve including a stop pin limit, the four-bar linkage including an inherent movement of limit, a low-voltage safety switch for actuation of the solenoid operated safety shutoff valve for entrapment of vertical motion hydraulic cylinder hydraulic fluid, which is operable even after normal timed ride, an electromechanical circuit including circuitry for timing the motor operation and returning or homing of capsule to straight-ahead direction upon cessation of ride, and including circuits for providing aircraft sounds as well as firing control noise of the weaponry in addition to sequential switching of the aircraft perimeter lights and additional switching of simulated firing of the weaponry lights, and supporting a cover about the hydraulic circuitry as well as movable triangular portions to prevent insertion of any body members within the linkage whereby the aircraft simulates elevated flight during movement of the cockpit through an up-and-down position actuated by the hydraulic cylinder through the four-bar linkage and providing inherent safety stops as well as a safety bar, and a low-voltage safety switch and safety shutoff valve in the event that the aircraft comes down on an object, thereby providing for safe simulated flight of an aircraft.

One significant aspect and feature of the present invention is a hydraulically powered four-bar linkage using a unique and novel selector valve requiring least hydraulic energy for lifting a structure such as a toy, whether the toy be an aircraft including a rotary-wing helicopter, fixed-wing airplane, astro capsule, space ship or the like, and including inherent safety and stop limits for safe operation, not only for the operator's safety but for nearby individuals and objects thereabout. The astro capsule includes a vertically raisable and horizontally rotatable structure, sequenced flashing aircraft lights, flashing gun lights and sound effects for rocket noise as well as firing control weaponry noise. The speaker for the noise generator is conveniently mounted behind the seat in the cockpit of the aircraft, providing for ample noise for the individual but not polluting the surrounding environment with noise.

Another significant aspect and feature of the present invention is a hydraulic circuit which uses a least amount of energy and is efficient in operation. The circuit includes a spool selector valve for ample raising as well as lowering of the structure about the joy stick, and provides for return to a rest position in the event of loss of hydraulic power.

Another significant aspect and feature of the present invention is a hydraulic circuit which provides through a selector valve for rotational directional control about the capsule's vertical axis while also providing means of homing or returning said capsule to straight ahead flight upon completion of timed event.

A further significant aspect and feature of the present invention is a hydraulically actuated aircraft which simulates real flight conditions to an individual and is reliable in operation as a hydraulically operated simulator/toy as well as providing safety of operation to the individual and surrounding environment.

Additional significant aspects and features of the present invention include a safety bar which overrides the throttle limit of the joystick and further keeps the oil in the hydraulic cylinder and a safety switch, secured to and independent of the safety bar, for entrapment of hydraulic fluid in the vertical motion hydraulic cylinder via action of the solenoid safety shutoff valve, during and after timed cycle operation. Also, the throttle is provided with a limit, the valve control link with a valve pin limit, an inherent four-bar linkage limit, and the safety stop bar limit. All the electronics are enclosed within two electrical boxes, providing for efficient replacement in the event of servicing, the electrical boxes being positioned under fiberglass housing structure of the framed base.

Having described embodiments of the present invention, it is the principal object hereof to provide a hydraulically actuated aircraft, the aircraft including a helicopter, airplane, space capsule, space ship, astro capsule, etc.

An object of the present invention is to provide a hydraulically actuated aircraft, the aircraft used for purposes of amusement as well as instruction.

Another object of the present invention is to provide a hydraulic circuit for an aircraft where the hydraulic circuit is reliable and efficient in operation.

A further object of the present invention is to provide an aircraft which is functionally safe in operating characteristics to the individual and the surrounding environment.

An additional object of the present invention is to provide an aircraft with an electrical circuit which simulates sounds of flight as well as sounds of firing weaponry.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF EMBODIMENTS

Figure 1:
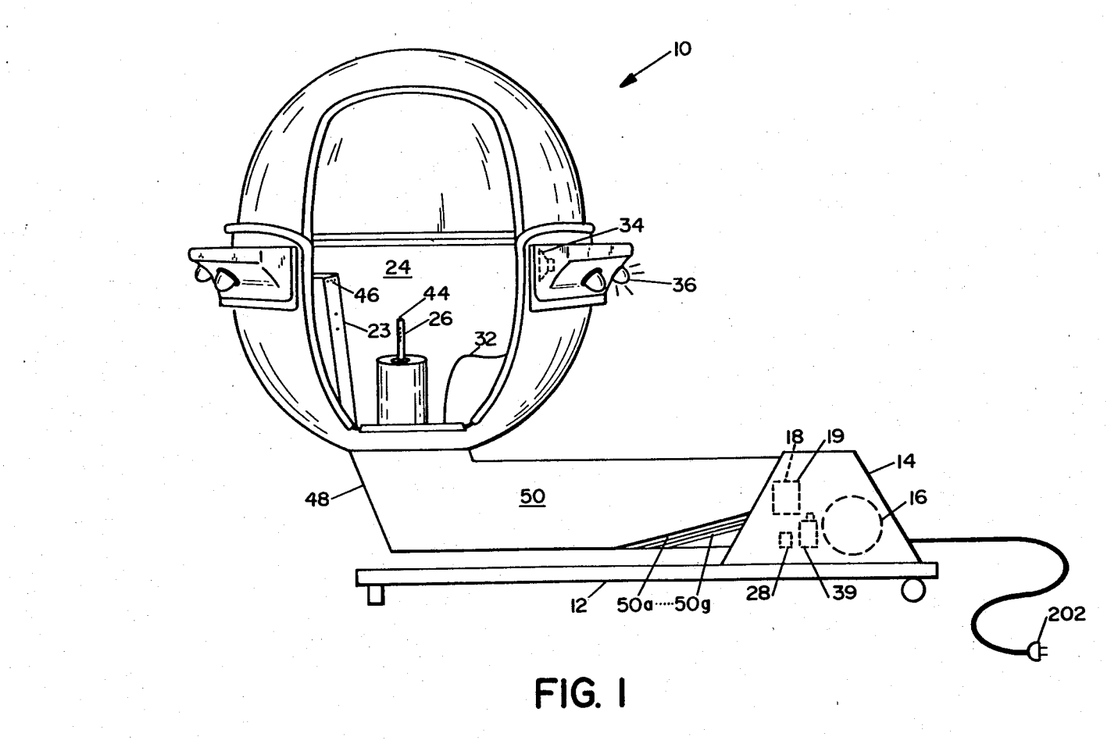
FIG. 1 illustrates a side view of an astro capsule, the present invention.

FIG. 1 illustrates an astro capsule 10, the present invention, positioned on a main frame 12 covered with fiberglass housing 14. The fiberglass housing 14 covers the hydraulic motor assembly 16, the electrical circuit components 18 and 19, and a portion of sideplates 20a and 20b, illustrated in FIG. 2, which are welded to the main frame 12 and support the lower end of a four-bar linkage 22 of FIG. 5 with an astro capsule body 24 positioned on the upper end of the four-bar linkage. A joystick 26 connects through the four-bar linkage to a hydraulic valve 28 of FIG. 2 for actuating, when the joystick is moved longitudinally, a hydraulic cylinder 30, FIG. 2, providing for vertical lift of the astro capsule body 24. Joystick 26, which when manually moved laterally, provides for rotation of the astro capsule 24 about its vertical axis, through valve 39 and actuating cylinders 31a and 31b of FIG. 2. A seat 32 accommodates a small individual within the body. A speaker 34 is located behind the seat providing for electronically generated rocket sounds and firing weapon sounds within the body of the astro capsule but yet not invading the outside environment with environmental noise. A plurality of sequenced flashing flight lights 36 position around the mid-circumference of the astro capsule body, each light illuminating sequentially to give the visual effect of traveling circumferentially around the perimeter of the astro capsule, each light following the previous light. A weaponry firing switch 44 is positioned in the joystick 26 and a plurality of flashing lights 46 positioned on the astro capsule instrument panel 23 for simulating weaponry firing. A suitable cloth shield 48 covers the four-bar linkage and triangular members 50a-50g are pivoted to protect either side of the four-bar linkage, as later described in detail.

Figure 2:
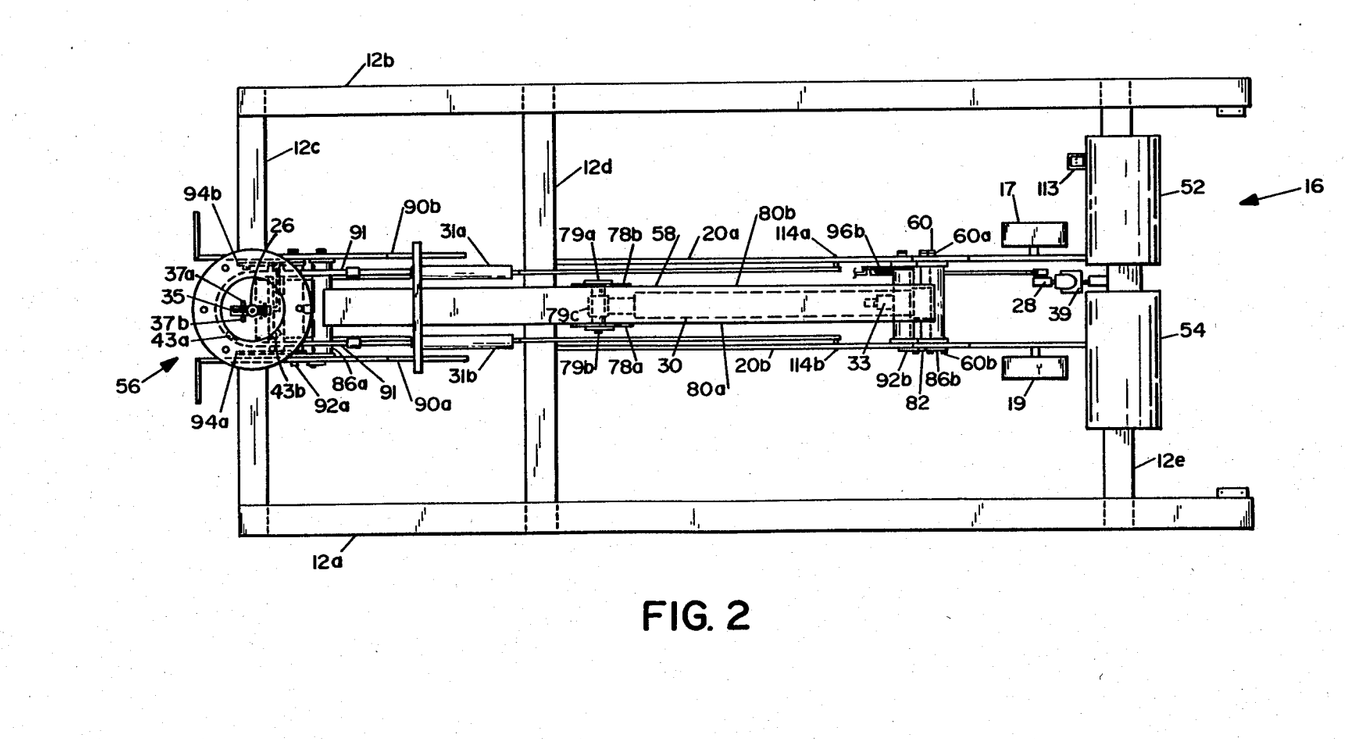
FIG. 2 illustrates a top view of the support structure with the astro capsule body removed.

FIG. 2 illustrates a top plan view of an astro capsule 10 of FIG. 1 with an astro capsule body 24 of FIG. 1 and the fiberglass housing 14 of FIG. 1 removed. The frame is constructed of square steel tubing with members 12a-12e appropriately welded together to form the interlaced rectangular frame. Sideplates 20a and 20b are welded between support members. The hydraulic assembly 16 includes a motor 52, a pump and tank 54, the valve 28, controlling cylinder 30, is connected through a linkage to the joystick 26, and valve 39 is controlled electrically by the joystick 26 which controls, through valve 39, hydraulic cylinders 31a and 31b. The joystick positions on a pedestal assembly 56 which rotates about pad assembly 116B which is attached upon lift arm between plates 20a and 20b and is secured thereto with a snap ring 60a and a lock pin 60b which is subsequently bolted to plate 20b.

Figure 3:
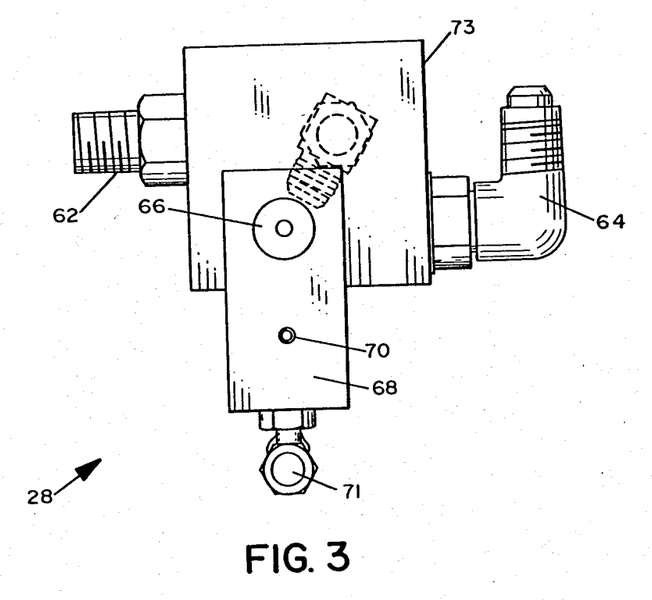
FIG. 3 illustrates a plan view of a hydraulic valve for a hydraulic circuit of the astro capsule.

FIG. 3 illustrates a plan view of the hydraulic valve 28 including an inlet port 62, outlet port 64, a rotatable spool 66, a link 68 secured to the spool 66, pin 70, and an eye 71 in a housing 73.

Figure 4:
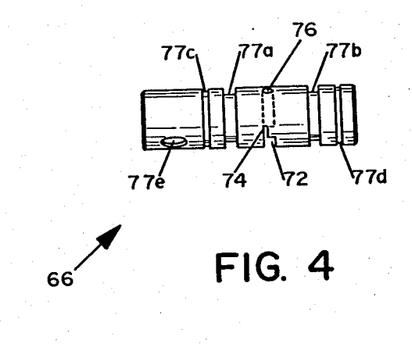
FIG. 4 illustrates a plan view of a spool of the hydraulic valve of FIG. 3.

FIG. 4 illustrates a side view of the spool 66 showing a wide orifice 72 and a narrow orifice 74. The small narrow orifice 74 provides for upward lift of the astro capsule while the wide orifice 72 provides for a fast downward movement of the astro capsule. Hole 76, O-ring grooves 77a and 77b, snap ring grooves 77c and 77d, link 68 to mounting hole 77e as illustrated. Hole 76 is a pressure balancing hole providing for equalized pressure of the hydraulic fluid about the spool.

Figure 5:
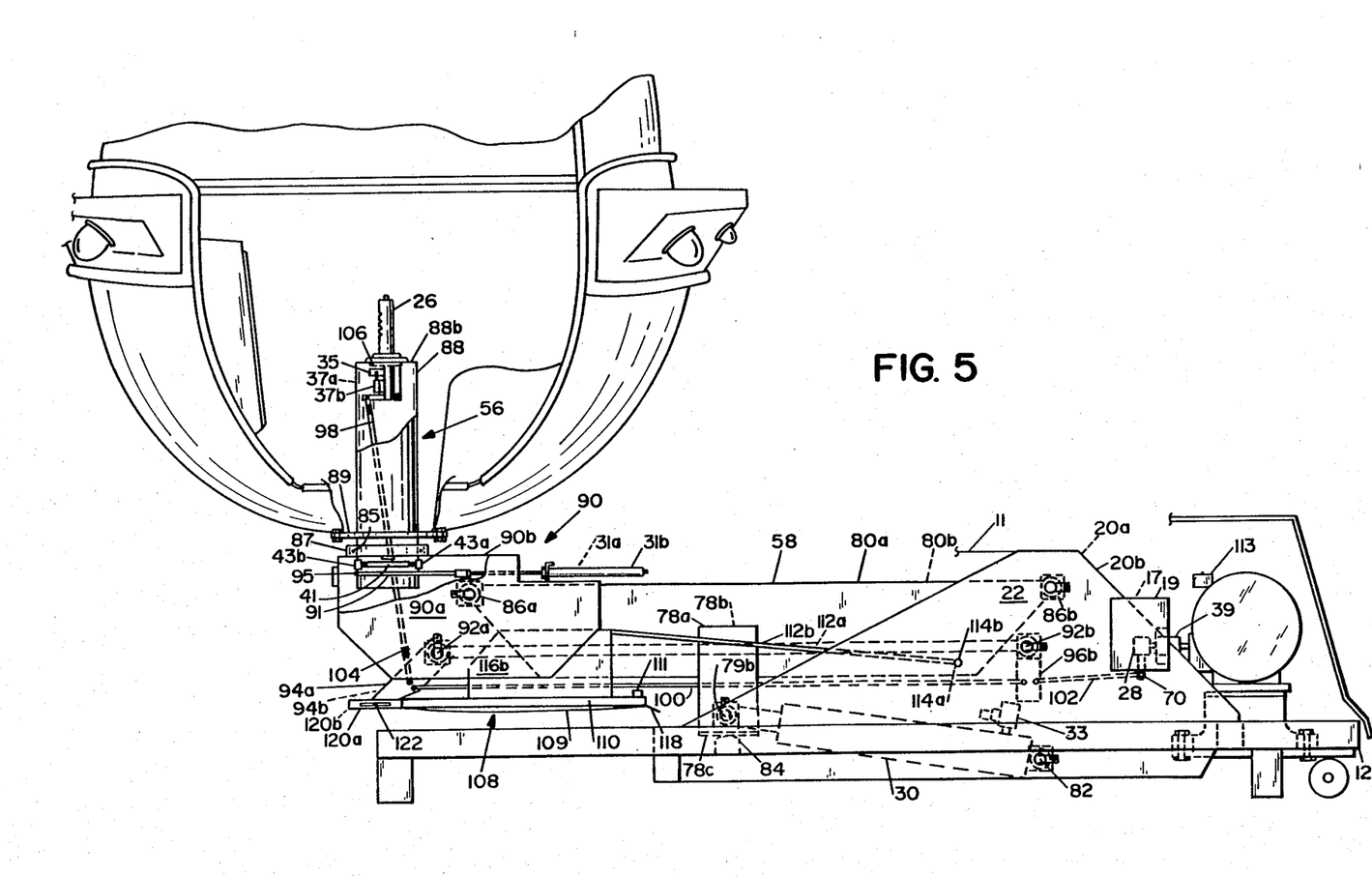
FIG. 5 illustrates a side view of the structure for raising the astro capsule in a rest position.

FIG. 5 illustrates a side view of the structure of the astro capsule 10 in a rest position. Opposing ears 78a and 78b weld onto both sides of lift arm 80a and 80b for axially supporting a pivot points 79a and 79b by pivot tube 79c as shown in FIG. 2, one end of the hydraulic cylinder 30, whereupon which is mounted a safety solenoid shutoff valve 33, pivotally secures to the frame at point 82. A rubber bumper padding 84 secures to the frame and provides for cushioning of the end of the hydraulic cylinder including the raisable four-bar linkage assembly affixed to the lift arm assembly 58. The lift arm 58 is patterned out of beam channel with appropriate pivot tubes 86a and 86b welded at each end. A flat plate 78c welds to the bottom of the ears 78a and 78b providing for a rest member against the rubber bumper pad 84. The pedestal assembly 56 includes a pedestal tube 88 having a disc covering 88b. Joystick 26 positions on the disc 88b. The pedestal tube 88 is mounted to and passes through bearing 85 which is secured in housing 87, housing 87 is welded to the base of a configured channel bar 90 which engages over the pivot tube 86a and is pinned thereto for movement about the pivot tube 86a. The sides 90a and 90b also shown in FIG. 2 engage over the sides 80a and 80b respectively. An astro capsule body mounting plate 89 is welded to pedestal tube 88. Two additional pivot points 92a and 92b include two barbell cranks 94a and 94b at pivot point 92a and barbell crank 96b at pivot point 92b. Pivot points 92a, 92b, 86a and 86b provide the pivot points for the four-bar linkage. A linkage 98 connects from the joystick 26 to the barbell 94b, a linkage 100 connects from the barbell 94b to 96b, and a linkage 102 connects from the barbell 96b to the pin 70 of the valve 28. The end of adjustable linkage 98 is threaded to move rotationally with the astro capsule body 24 at 104. Micro switches 37a and 37b are actuated by cam 35 and are linked electrically to a four-way, three-position solenoid valve 39. Solenoid valve 39 actuates hydraulic actuating cylinder 31a or 31b which are secured laterally across sides 90a and 90b. A steel cable 91 is secured at 95 to the pedestal tube 88 and to hydraulic actuators 31a and 31b. Micro switches 43a and 43b are secured so as to be actuated by cam slot 41 for positioning at the four-way three-position solenoid valve 39 for return or homing of the astro capsule body 24 to its straight-ahead position by action of appropriate hydraulic acutator 31a or 31b. An elongated hole 106 is provided in the disc 88b for stop limit movements of the joystick 26. A safety bar assembly 108 includes a safety switch 109, low voltage rectifier bridge 111 for operation of safety shufoff valve 33, safety panel 110, linkage bars 112a and 112b which pivot at points 114a and 114b, side covers 116a and 116b, bar 118, slotted keys 120a and 120b and pin 122.

Figure 6:
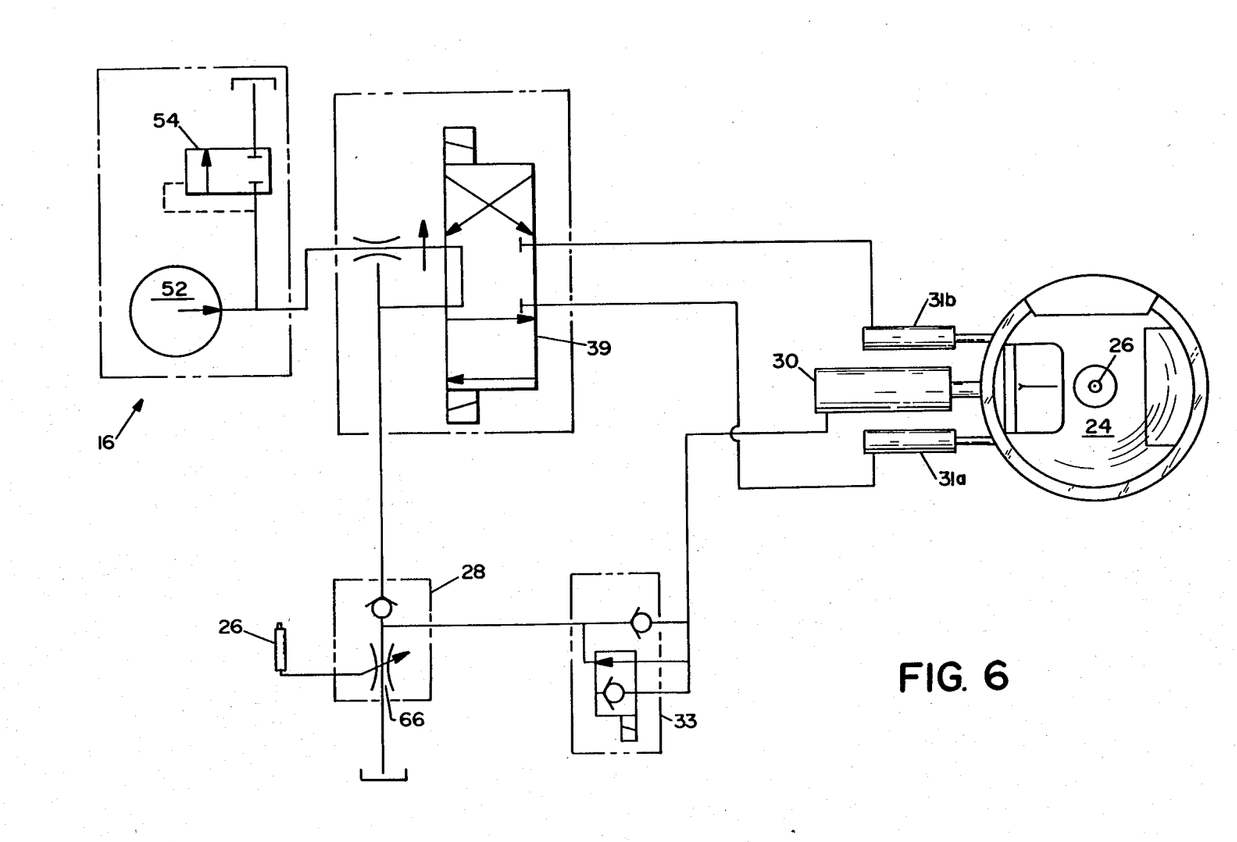
FIG. 6 illustrates a schematic diagram of the hydraulic circuit.

FIG. 6 illustrates a schematic diagram of the hydraulic circuit. All numerals correspond to those elements previously described. The flow is dependent upon the spool cross section, the spool being illustrated in FIG. 4 for the valve of FIG. 3.

Figure 7:
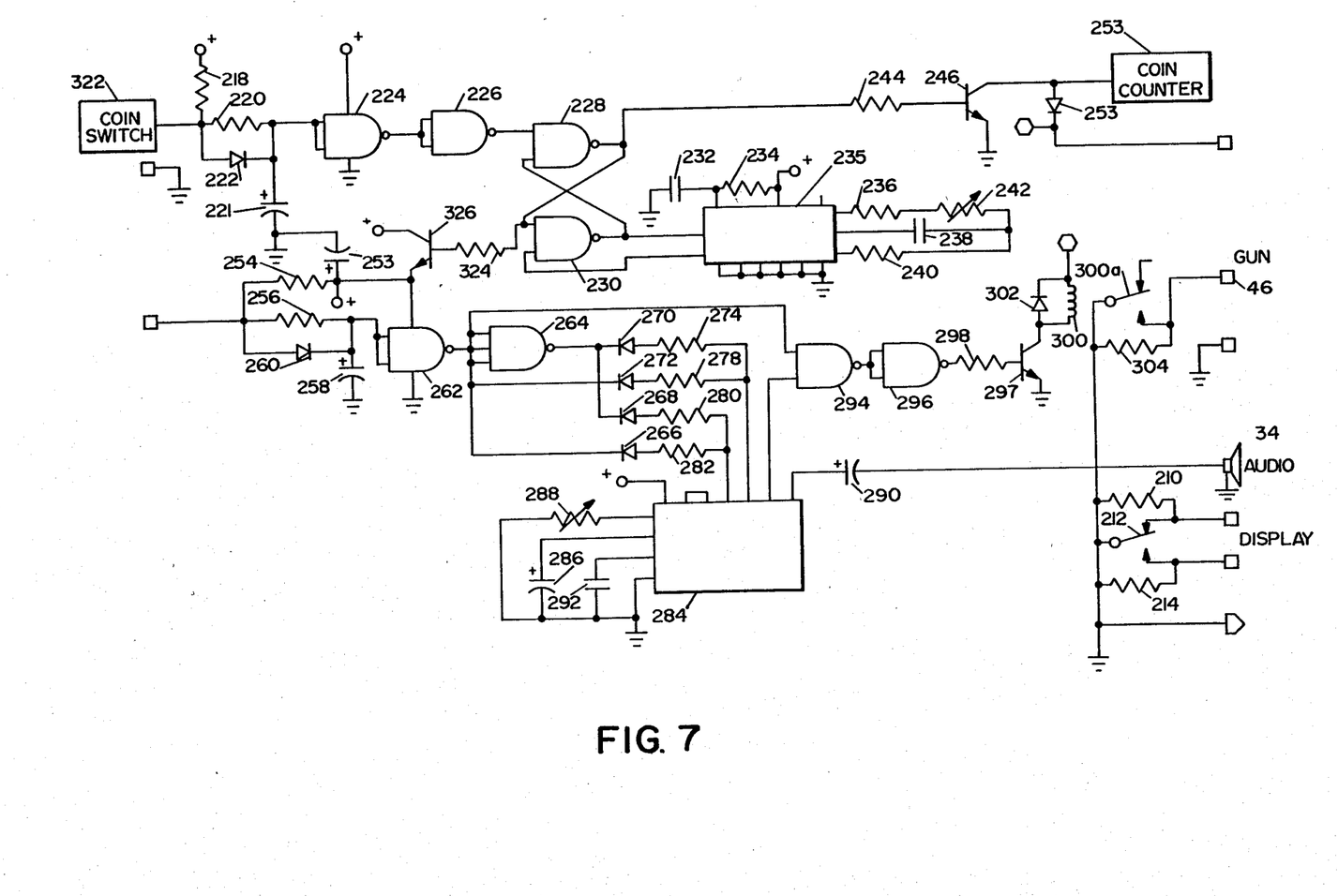
FIG. 7 illustrates an electrical circuit schematic for the audio and timing function of the astro capsule.

FIG. 7 illustrates an electrical circuit schematic diagram of the electromechanical and electronic control of the astro capsule 10. The electrical circuit 200 provides audio output through the speaker 34, and flashes the gun light 46. Inputs on the left-hand side of the circuit diagram include the coin switch 322, the weaponry firing switch 44, and AC power at 202. Once a coin is deposited through the coin switch 322, the timing of the astro capsule ride is determined by components 218-250 where inverters include components 218-226, flip-flop 228-230, oscillator timer 232-242 where the time is set by potentiometer 242. The rocket noise of the astro capsule and the phasor weaponry is produced by components 254-304. The gun switch 44 actuates the phasor weaponry firing. Components 324-326 turn on the rocket noise and phasor noise produced by integrated circuit 284 including components 286-292. Components 254-282 switch over the rocket noise generator circuit to the rocket phasor noise generator circuit when the two are combined, and components 294-300 provide the light-flashing circuitry for the front weaponry lights 36.

Figure 8:
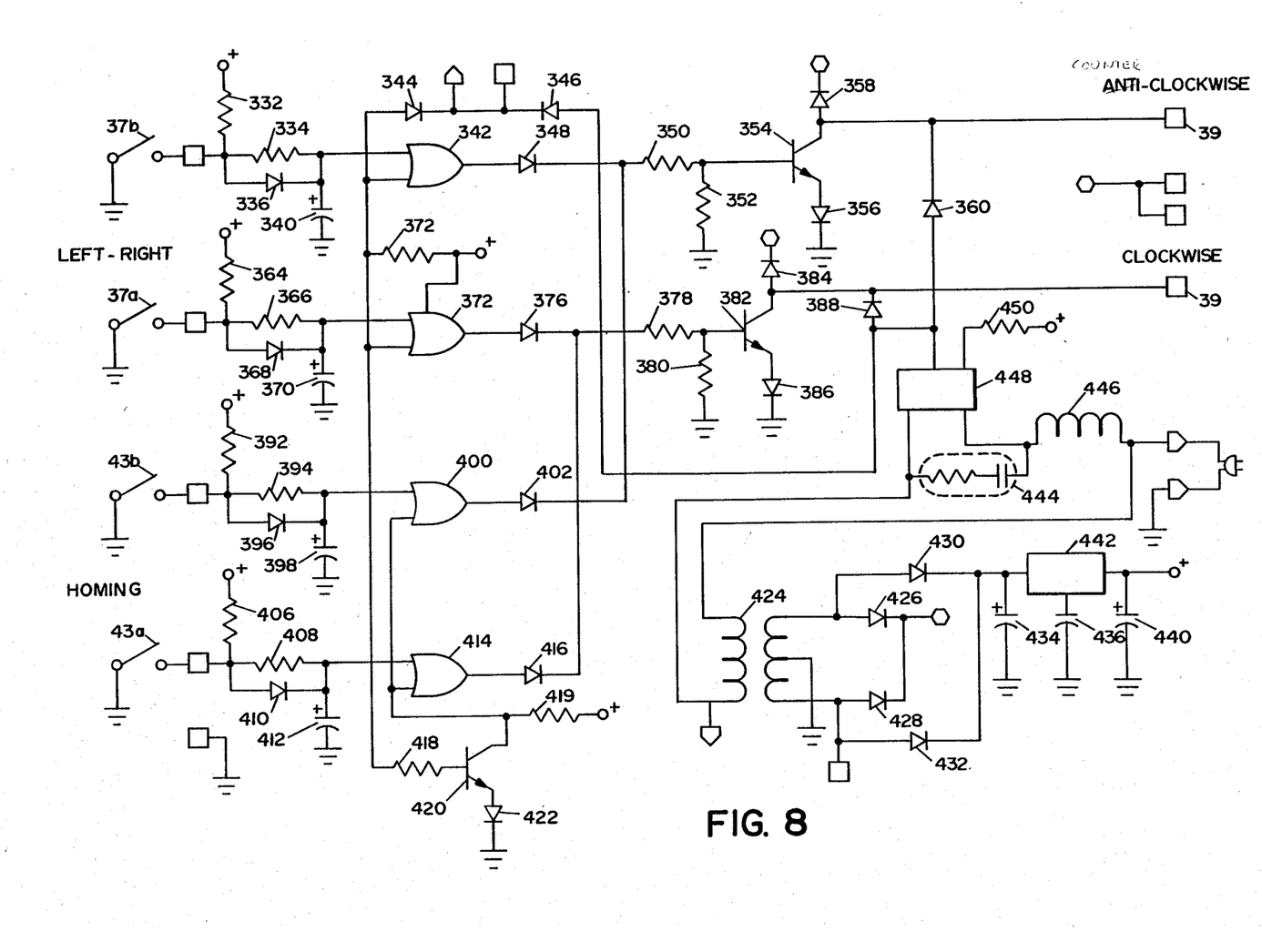
FIG. 8 illustrates an electrical circuit schematic for directional control and homing of the astro capsule.

FIG. 8 illustrates an electrical circuit schematic diagram of the electromechanical and electronic directional control of the astro capsule. The electrical control 300 provides electrical outputs for actuation of hydraulic actuators 31a and 31b, of FIG. 5, for movement of the astro capsule about its vertical axis. Inputs on the left-hand side of the circuit diagram include joystick micro switches 37a and 37b and pedestal tube micro switches 43a and 43b in FIG. 5. Components 332-342 and 348-358 provide, when micro switch 37b is depressed, switching to position the four-way three-position solenoid valve 39 for anti-clockwise motion of the pedestal tube 88 and astro capsule 24. Components 364-384 provide, when micro switch 37a is depressed, switching to position the four-way three-position valve 39 for clockwise motion of pedestal tube 88 and astro capsule body 24. Upon termination of the timed ride, the normally closed micro switch 43b, when engaged in cam slot 41 of FIG. 5 provides switching through components 392-402 and 350-358 to command counterclockwise motion through positioning of four-way three-position valve 39 until the micro switch 43b is disengaged from cam slot 41; similarly the normally closed microswitch 43a, when engaged in cam slot 41, provides switching through components 406-416 and 378-384 to command clockwise motion through positioning of the four-way three-position valve 39 until the micro switch 43b is disengaged from cam slot 41 ultimately resulting in the astro capsule 24 being automatically directed or homed to the straight-ahead flight regime. The power supply includes components 424-442 for providing power through a full-wave bridge rectified voltage regulator power sypply.

Figure 9:
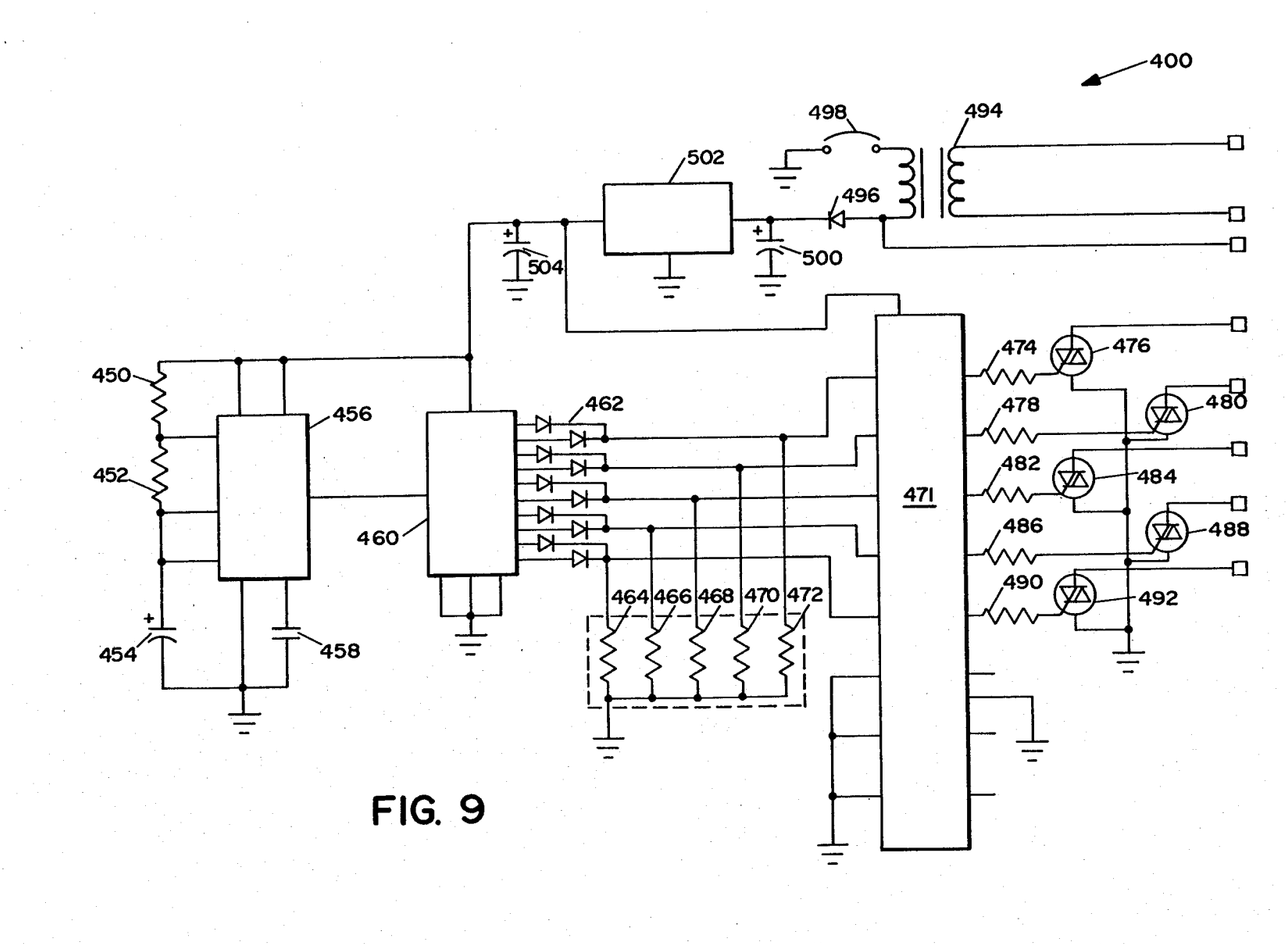
FIG. 9 illustrates an electrical circuit schematic for sequenced flashing lights of the astro capsule; and, FIG. 10 illustrates a perspective view illustrating the astro capsule in a raised position.

FIG. 9 illustrates an electrical circuit schematic diagram for the sequenced flashing lights 36 about the circumference of the astro capsule. The power supply includes components 494-504 through a rectified voltage regulator power supply.

MODE OF OPERATION

Figure 10:
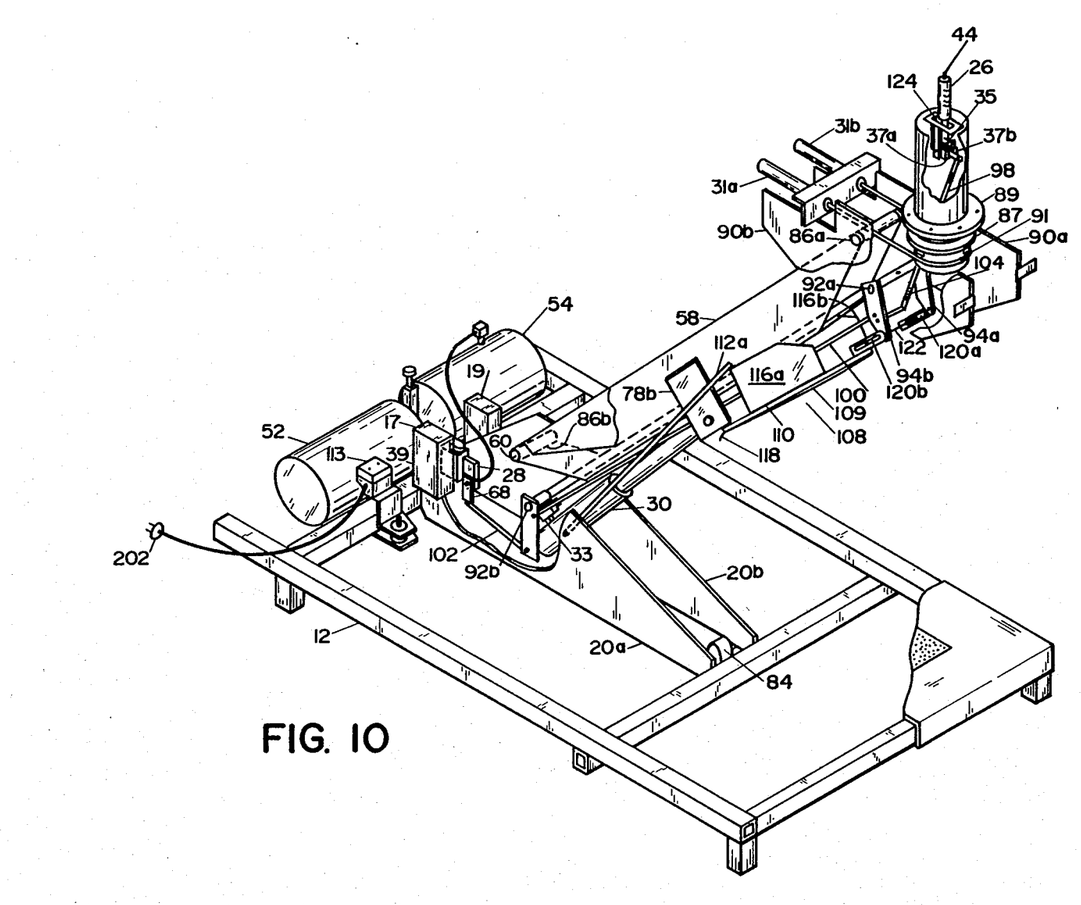

FIG. 10 illustrates operation of the astro capsule 10. In operation, the astro capsule 10 is plugged into electric power through wall plug 202. The individual then climbs into the astro capsule body 24 FIG. 1 and positions himself on the seat 32 with his head substantially aligned adjacent to the speaker 34 in preparation for flight. A coin is deposited in the coin switch box 322 for activating the hydraulic motor assembly 16 including the motor 52. Once the motor has started, the joystick 26 is in an activated position for simulated flight of pulling it back for upward lift and pushing it forward for downward lift from a neutral position or positioning the stick to the left for counterclockwise motion or to the right for clockwise motion, the limits of which are determined by the travel of the hydraulic actuators 31a and 31b. The electronic noise generator through the components 254-292 provides rocket noise through speaker 34, while a plurality of lamps 36 flash sequentially around the perimeter of the astro capsule. When the gun switch 44 is actuated, additional weaponry firing noise is added to the rocket noise and the weaponry firing lights 46 flash on and off as illustrated in FIG. 1.

When the joystick 26 is pulled back, linkages 98, 100 and 102 through link 68 rotate the spool 66 in the valve 28 thereby providing hydraulic fluid to the cylinder 30 forcing the piston outwardly and raising the lift arm assembly 58 about the pivot point 60. This raising continues until the joystick is returned to a neutral position or one of the stop limits is reached, which will later be described in detail. When the joystick is positioned laterally, joystick cam 35 engages micro switch 37a or 37b which positions the four-way three-position solenoid valve, thus porting hydraulic fluid to actuator 31a or 31b respectively, thus rotating said astro capsule in a clockwise or counterclockwise fashion respectively until the joystick is returned to a neutral position. When ride duration has lapsed, the capsule will return to the straight-ahead flight regime as previously described in FIG. 8.

FIG. 10 illustrates a view of the lift arm assembly 58 fully raised by the cylinder 30. It is actuated by the joystick 26. The lift arm will rise to the absolute height based on the inherent structural design but is limited by stop, so as not to drain the hydraulic oil from the tank 54.

The astro capsule 10 has a number of inherent stop limits. The first stop limit is the joystick slotted member 124. This limits movement of the joystick. The second stop limit is pin 70 in the valve 28, limiting movement of the valve control link 68. The third stop limit is the inherent limit of the four-bar linkage as to movement through the pivot points of the four-bar linkage. The fourth stop movement is the inherent limit of how far an individual can pull the joystick backward which is also considered as a joystick stop limit. The safety bar 108 also provides an override throttle fifth limit and helps to maintain hydraulic fluid in the cylinder of the hydraulic assembly. A sixth stop movement is provided by safety switch 109, using low direct-current voltage from unswitched transformer 113 and rectifier 111, which maintains hydraulic fluid in the cylinder by action of the safety shutoff solenoid vavle 33, even in the event that the programmed ride time has elapsed. The slots 120a and 120b provide limited movement for the pin 122 which also provides an inherent seven-stop limit. The safety features are particularly important with respect to the safety bar assembly in that an individual or object if under the safety bar about the lower portion of the lift arm prohibits movement of the lift arm 58 by overriding the joystick 26 through the bellbar crank 94a and 94b. The spool provides for downward movement after upward movement in that a large area is provided for downward lift while a small area of the spool is provided for an upward lift, the spool being illustrated in FIG. 4. Reference is made to narrow area 74 with respect to wide area 72 which controls upward movement and downward movement respectively.

Various modifications can be made to the present invention without departing from the apparent scope thereof.

Having thus described the invention, what is claimed is:

1. Astro capsule comprising:
   a. frame support means including a main frame and a raisable four-bar linkage having one end rotatably secured to said main frame and a capsule body rotatably supported on an other end of said linkage;
   b. hydraulic means including a motor-driven hydraulic pump, a reservoir, plurality of configured valve means connected thereto in a hydraulic circuit, a first hydraulic cylinder connected between said main frame and a midpoint of said four-bar linkage to provide for vertical lift of said capsule body, and a second and third hydraulic cylinder for rotating said capsule body;
   c. stop means for limiting distance of travel of said four-bar linkage;
   d. joystick means including four positions of movement positioned at said other end of said four-bar linkage and including linkage means mechanically connected to said valve means for control of said first hydraulic cylinder and electrically connected to said valve means for control of said second and third hydraulic cylinders; and,
   e. said capsule body mounted about said joystick means whereby said hydraulic cylinders when actuated provides simulated space flight.

2. Astro capsule of claim 1 including safety bar means under a lower portion of said four-bar linkage, pivoting structure means at one end of said safety bar means connected to said main frame and slotted pivoting means at the other end of said safety bar means connected to said joystick means, said safety bar means prohibiting movement of said joystick means when and if an object or indivdual under said four-bar linkage comes in contact with said safety bar means.

3. Astro capsule of claim 2 including at least one barbell crank means connected in said linkage means of said joystick means.

4. Astro capsule of claim 3 including a first barbell crank means connected to said joystick means and said linkage means and also connected to said four-bar linkage and said slotted pivoting means of said safety bar means, and a second barbell crank means connected between said linkage means and said valve means and pivotable about a shaft rotatably secured in said frame means.

5. Astro capsule of claim 4 wherein said shaft includes a bar affixed thereto, an end of said bar bolted to said frame means and a snap ring assembled at an other end.

6. Astro capsule of claim 2 including a switch connected to said safety bar means and a hot-wired circuit means connected between said switch and said hydraulic means to maintain fluid in said first hydraulic cylinder and prevent descent of said four-bar linkage if said switch is activated by body under said safety bar means.

7. Astro capsule of claim 6 wherein said switch connects to a safety solenoid shutoff valve in said hydraulic circuit so as to maintain the fluid in said first hydraulic cylinder.

8. Astro capsule of claim 6 wherein said safety bar means and safety switch means provides a stop limit for protection against injury to individuals or objects positioned under the four-bar linkage in the elevated position.

9. Astro capsule of claim 1 wherein said joystick means includes adjustable means at one end for connection to said linkage means and swivel means at an other end.

10. Astro capsule of claim 1 wherein said joystick means includes stop limit means on said joystick means for providing safety of flight.

11. Astro capsule of claim 1 further comprising electronic control means connected to said hydraulic means for control of hydraulic cylinders and further including means for generating sounds of flight, means for generating weapon firing, means for outside sequenced flashing flight lights, means for flashing instrument panel lights and means for outputting said generated sounds in said aircraft body.

12. Astro capsule of claim 11 wherein said electronic control means includes means for timing operation of said hydraulic circuit and means for generating sounds and visual effects of flight.

13. Astro capsule of claim 1 including external vertical side housing means movable with said linkage for protecting said linkage from insertion of any object therein.

14. Astro capsule of claim 1 wherein said four-bar linkage includes an inherent stop limit to top raisable height.

15. Astro capsule of claim 1 including means for homing said body to a return position on an end of a timing cycle.

* * * * *